Jan. 3, 1928.
W. A. BROWNE
1,655,009
SPEED GOVERNING MECHANISM
Filed Dec. 29, 1922
2 Sheets-Sheet 1
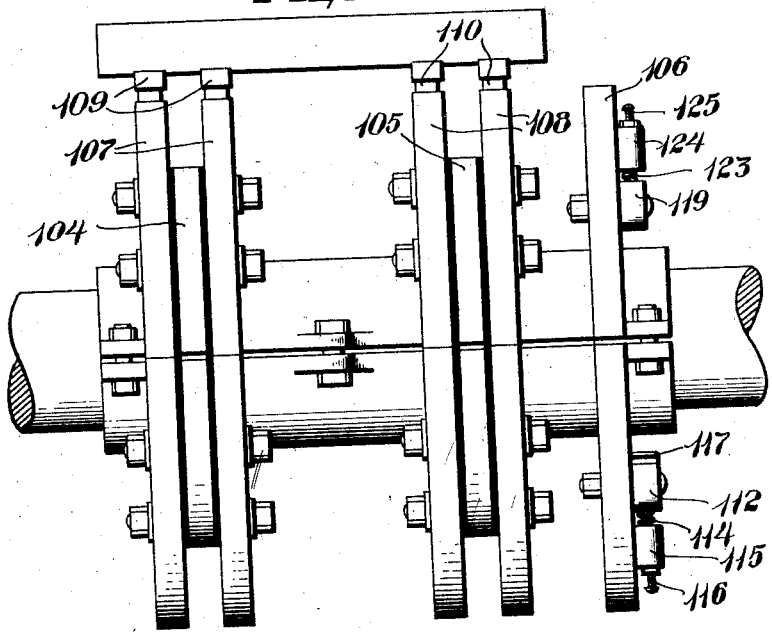
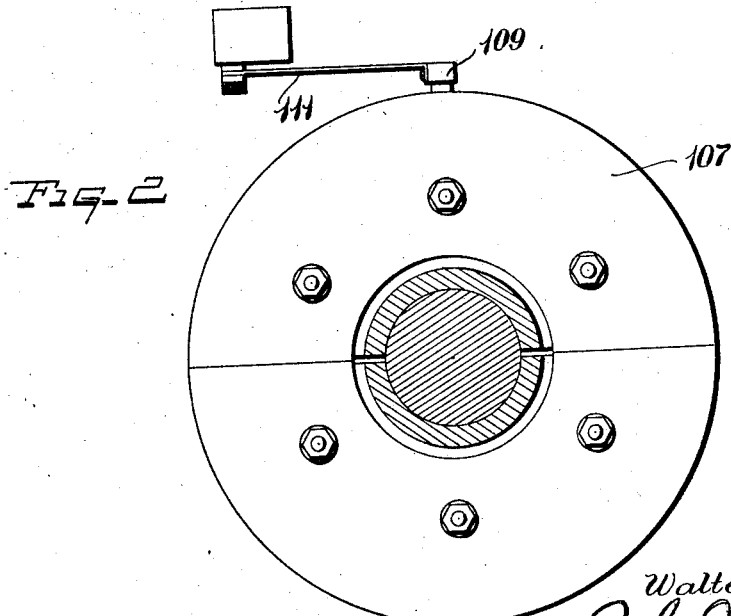
Inventor
Walter A. Browne
By John J. McCarthy
Attorney Jan. 3, 1928. 1,655,009
W. A. BROWNE
SPEED GOVERNING MECHANISM
Filed Dec. 29, 1922 2 Sheets-Sheet 2

Inventor
Walter A. Browne
By John J. McCarthy
Attorney

Patented Jan. 3, 1928.

1,655,009

UNITED STATES PATENT OFFICE.

WALTER A. BROWNE, OF WASHINGTON, DISTRICT OF COLUMBIA, ASSIGNOR TO WARTHEN TRAIN CONTROL CORPORATION, OF WASHINGTON, DISTRICT OF COLUMBIA, A CORPORATION OF DELAWARE.

SPEED-GOVERNING MECHANISM.

Application filed December 29, 1922. Serial No. 609,650.

My present invention covers improvements in speed governing mechanism for use in connection with automatic train stopping and speed controlling apparatus such, for example, as is covered by my co-pending application for patent Serial No. 598,285, filed November 1, 1922, my present invention illustrating the specific mechanism shown and described in my co-pending application hereinbefore referred to.

In carrying out the present invention it is my purpose to provide a speed governing mechanism which will embody, among other features, maximum and minimum speed controlling means, and which may be connected up with brake controlling mechanism as shown in my co-pending application hereinbefore referred to, so that the train will be stopped under certain circumstances in the event of the speed thereof exceeding that at which the minimum speed controlling means is set, and whereby the breaking apparatus may be brought into service to stop the train in the event the speed thereof exceeds that at which the maximum speed governing mechanism is set.

It is also my purpose to provide speed governing mechanism of the class described which will embrace the desired features of simplicity, efficiency and durability, which may be manufactured, installed and maintained at small cost and which will operate effectively under all conditions.

With the above recited objects in view, and others of a similar nature, the invention resides in the construction, combination and arrangement of parts set forth in and falling within the scope of the appended claim.

In the accompanying drawings:

Figure 1 is a view in side elevation of speed governing mechanism constructed in accordance with my invention, the same being shown as applied to one of the axles of the locomotive or tender.

Figure 2 is a view in end elevation thereof, the axle and sleeve-like casting that surrounds the axle being shown in cross section.

Figure 3:
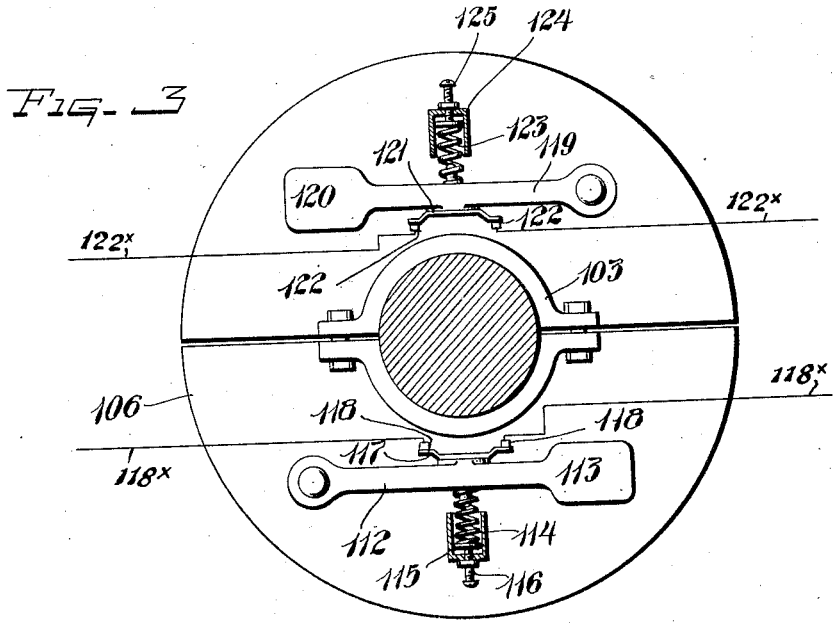
Figure 3 is a similar view showing the other end of the governor mechanism.
Figure 4:
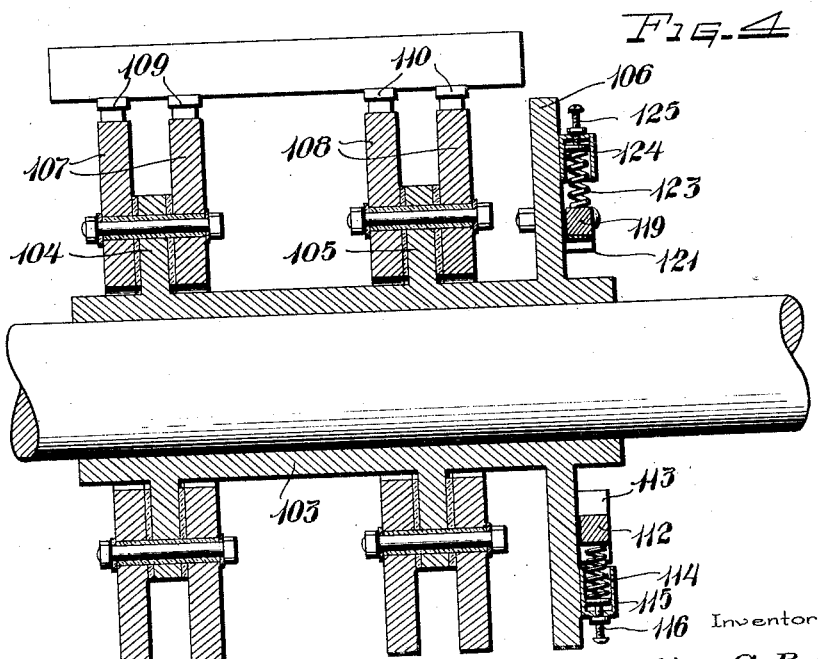
Figure 4 is a longitudinal sectional view through the same.

In this instance, the speed governing mechanism comprises a sleeve-like casting 103, formed of complementary sections bolted together around one of the axles of the locomotive or tender, as the case may be, and provided with circular flanges 104, 105, of substantially the same diameter and a circular flange 106 of a diameter greater than that of the flanges 104, 105. Bolted to the flanges 104 and 105 are pairs of conductive disks 107, 108, respectively, that are insulated from the flanges, and the disks of each pair are also insulated from each other, as clearly shown in the drawings. Bearing upon the disks 107 and 108, respectively, at the peripheries thereof are pairs of contact brushes 109 and 110 that are carried by spring arms 111 suitably fastened to the car body or running gear, so that the brushes may maintain a rubbing contact with the disks in the rotation of the latter incident to the revolution of the axle to which the casting 103 is fixed. Pivoted at one end to one face of the disk 106 is a lever 112 that has its other end weighted as at 113, so that the lever may respond to centrifugal force in the rotation of the disk 106. The lever is held in normal position by a spring 114 which is seated in a cup 115 carried by the disk and bears against the lever, an adjustment 116 being provided so that the tension of the spring may be varied. This lever 112 carries a contact strip 117 that normally engages contacts 118 carried by the adjacent face of the disk. A second lever 119 is also pivoted at one end to one face of the disk 106 at a point diametrically opposite the pivot point of the lever 112 and has its other end weighted, as at 120, so as to respond to centrifugal force. This lever 119 carries a bridging contact strip 121 that normally engages contacts 122 carried by the adjacent face of the disk, and the lever strip 121 is held normally against the contacts and against the action of centrifugal force by a spring 123 seated in a cup 124 and equipped with tension adjusting means 125. The contacts 118 are electrically connected, preferably through conductors 118ˣ, with the disks respectively of the pair 108, while the contacts 122 are likewise connected, preferably through conductors 112ˣ, with the disks of the pair 107, the conductors 118ˣ and 122ˣ being shown in Figure 3 as being capable of being connected to the disks 108 and 107, respectively, in any conventional manner which per se is not of my invention. The disks 107 and the lever 119 and associated parts constitute the high speed governor, while the disks 108 and lever 112 and associated parts form the low speed governor, the spring of the high speed governor being of heavier gauge and greater tension than that of the minimum speed governor. Thus, when the train or car is travelling below the minimum speed at which the low speed governor is set, the levers 112 and 119 of both governors are in normal positions and the controlled circuits closed, while when the car is moving above the minimum speed, but below the maximum, the low speed governor opens its controlled circuit, incident to the lever 112 swinging outwardly under the action of centrifugal force against the tension of the spring 114. When the speed of the car exceeds the maximum for which the high speed governor is set, then the lever 119 swings outwardly against the action of centrifugal force and opens the controlled circuit at the contacts 122.

The contacts 118 and the contacts 122 are connected respectively in circuits that control the brake applying apparatus, and as these circuit connections and the brake applying apparatus are shown and described in my co-pending application, previously referred to, further detailed description herein is not believed necessary.

While I have herein shown and described a preferred embodiment of my invention by way of illustration, I wish it to be understood that I do not limit or confine myself to the precise details of construction herein described and claimed, as modifications and variations may be made within the scope of the claim and without departing from the spirit of the invention.

Having thus described the invention, what is claimed as new, is:—

In speed governing means, a rotatable body having annular flanges, pairs of disks carried by two of said flanges, brushes opposed to said disks, pairs of spaced contacts on the remaining flange of the body and designed to be electrically connected with said pairs of disks, said pairs of contacts at diametrically opposed points, levers having means movable into and out of engagement with said contacts to make and break circuits, each of said levers pivoted at one end, cups on the flange and back of the levers, adjusting means in the cups, and springs in the cups and interposed between the adjusting means and the levers.

In testimony whereof I have hereunto set my hand.

WALTER A. BROWNE.